US012583121B2

(12) United States Patent
 Yuelai et al.

(10) Patent No.: US 12,583,121 B2
(45) Date of Patent: \*Mar. 24, 2026

(54) CALIBRATION APPARATUS FOR CALIBRATING MECHANISM ERROR PARAMETER FOR CONTROLLING ROBOT

(71) Applicant: Fanuc Corporation, Yamanashi (JP)

(72) Inventors: Wang Yuelai, Yamanashi (JP); Soichi Arita, Yamanashi (JP); Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

This patent is subject to a terminal disclaimer.

(21) Appl. No.: 18/199,089

(22) Filed: May 18, 2023

(65) Prior Publication Data

US 2023/0286160 A1 Sep. 14, 2023

Related U.S. Application Data

(63) Continuation of application No. 16/832,564, filed on Mar. 27, 2020, now Pat. No. 11,712,806.

(30) Foreign Application Priority Data

Apr. 1, 2019 (JP) ................................. 2019-069987

(51) Int. Cl.
 *B25J 9/16* (2006.01)
 *B25J 13/08* (2006.01)
 *B25J 19/02* (2006.01)
(52) U.S. Cl.
 CPC ........... *B25J 9/1692* (2013.01); *B25J 9/1653* (2013.01); *B25J 13/088* (2013.01); *B25J 19/022* (2013.01)

(58) Field of Classification Search
 CPC ...... B25J 9/1692; B25J 9/1653; B25J 13/088; B25J 19/022; B25J 9/10; B25J 9/161;
 (Continued)

(56) References Cited

U.S. PATENT DOCUMENTS 10,173,325 B2 1/2019 Motoyoshi et al.
10,569,418 B2 2/2020 Murata
 (Continued)

FOREIGN PATENT DOCUMENTS

CN 1831468 A 9/2006
CN 102458779 A 5/2012
 (Continued)

OTHER PUBLICATIONS

Japanese Notice of Reasons for Refusal for Japanese Application No. 2022-044625, dated Feb. 7, 2023 with translation, 10 pages.
 (Continued)

*Primary Examiner* — Esvinder Singh
(74) *Attorney, Agent, or Firm* — BUCHANAN INGERSOLL & ROONEY PC

(57) ABSTRACT

A robot controller includes at least one memory that stores a plurality of mechanism error parameters including a first mechanism error parameter and a second mechanism error parameter. At least one processor of the robot controller acquires an actual measurement position and information on a status of a robot by driving the robot with a plurality of orientations at a plurality of positions based on the second mechanism error parameter. The at least one processor calculates a third mechanism error parameter by correcting a value of the first mechanism error parameter based on the acquired actual measurement position and information on the status of the robot. The robot is controlled based on the
 (Continued)

plurality of mechanism error parameters including the second mechanism error parameter and the third mechanism error parameter.

8 Claims, 4 Drawing Sheets

(58) Field of Classification Search
CPC .......... B25J 9/163; G05B 2219/39033; G05B 2219/14087; G05B 2219/23159; G05B 2219/23399; G05B 2219/23432; G05B 2219/36518; G05B 2219/39024; G05B 2219/39026

See application file for complete search history.

(56) References Cited

U.S. PATENT DOCUMENTS

| | | | |
|---|---|---|---|
| 11,712,806 B2* | 8/2023 | Yuelai | B25J 13/088 |
| | | | 700/254 |
| 2012/0078418 A1 | 3/2012 | Borm et al. | |
| 2012/0239194 A1* | 9/2012 | Kagawa | B25J 9/1692 |
| | | | 700/254 |
| 2015/0266183 A1 | 9/2015 | Alifragkis et al. | |
| 2016/0052141 A1* | 2/2016 | Ide | B25J 13/088 |
| | | | 901/46 |
| 2017/0016712 A1 | 1/2017 | Suzuki | |
| 2017/0080575 A1 | 3/2017 | Meyer et al. | |
| 2018/0023946 A1 | 1/2018 | Elliot | |
| 2018/0126547 A1 | 5/2018 | Corkum et al. | |
| 2019/0187660 A1 | 6/2019 | Yanaka et al. | |
| 2019/0255708 A1* | 8/2019 | Fujita | B25J 19/023 |
| 2020/0039075 A1* | 2/2020 | Katsiaris | G01B 5/008 |
| 2020/0156252 A1 | 5/2020 | Ko et al. | |
| 2020/0189112 A1* | 6/2020 | Kuruvilla | B25J 9/1692 |
| 2020/0298403 A1 | 9/2020 | Nilsson et al. | |
| 2021/0039259 A1 | 2/2021 | Duprez et al. | |

FOREIGN PATENT DOCUMENTS

| | | |
|---|---|---|
| CN | 106903687 A | 6/2017 |
| CN | 107263463 A | 10/2017 |
| CN | 109531604 A | 3/2019 |
| DE | 10 2016 116 702 A1 | 3/2017 |
| DE | 10 2016 119 605 A1 | 4/2017 |
| JP | 62126404 A | 6/1987 |
| JP | 04310385 A | 11/1992 |
| JP | 05301196 A | 11/1993 |
| JP | 06309016 A | 11/1994 |
| JP | 07028514 A | 1/1995 |
| JP | 08141950 A | 6/1996 |
| JP | 2002189509 A | 7/2002 |
| JP | 2002292584 A | 10/2002 |
| JP | 2006110705 A | 4/2006 |
| JP | 2008012604 A | 1/2008 |
| JP | 2009274188 A | 11/2009 |
| JP | 2011230257 A | 11/2011 |
| JP | 2012196716 A | 10/2012 |
| JP | 2013010149 A | 1/2013 |
| JP | 2016187844 A | 11/2016 |
| JP | 2018012152 A | 1/2018 |
| JP | 6301045 B | 3/2018 |
| JP | 11090868 A | 4/2019 |
| WO | 2017167687 A2 | 10/2017 |

OTHER PUBLICATIONS

Entire patent prosecution history of U.S. Appl. No. 16/832,564, filed Mar. 27, 2020, entitled, "Calibration Apparatus for Calibrating Mechanism Error Parameter for Controlling Robot."

* cited by examiner

CALIBRATION APPARATUS FOR CALIBRATING MECHANISM ERROR PARAMETER FOR CONTROLLING ROBOT

CROSS REFERENCE TO RELATED APPLICATIONS

This application is a continuation application of U.S. patent application Ser. No. 16/832,564, filed Mar. 27, 2020, which claims benefit of Japanese Patent Application No. 2019-069987, filed Apr. 1, 2019; the disclosures of these applications are incorporated herein by reference in their entirety for all purposes.

BACKROUND OF THE INVENTION

Field of the Invention

The present invention relates to a calibration apparatus for calibrating a mechanism error parameter for controlling a robot.

DESCRIPTION OF RELATED ART

In the related art, it is known that various operations are performed by driving a robot with an attached operation tool. The robot moves the operation tool to a predetermined position and orientation based on a motion program. The position and orientation of the robot preferably agree with a position and an orientation that are specified in the motion program. However, because of a manufacturing error of components during the manufacturing of the robot and the influence of gravity during the driving of the robot, the position and orientation of the robot may be slightly deviated from the position and the orientation that are specified in the motion program.

In known control of the related art, a detector for detecting a three-dimensional position is disposed at a point remote from a robot in order to correct a motion of the robot (for example, see Japanese Unexamined Patent Publication No. 11-90868A). The detector for detecting a three-dimensional position can detect an actual position and orientation of the robot. The actual position and orientation of the robot are different from a position and an orientation that are specified in a motion program. A controller calculates a compensation matrix based on the position and orientation of the robot detected by the three-dimensional position detector and the robot position and orientation that are specified in the motion program. The controller can correct a motion of the robot by using the compensation matrix.

It is assumed that errors of multiple items may deviate the actual position of the robot from the position specified in the motion program. For example, the actual position of the robot is deviated from the position specified in the motion program because of an error of an arm length between drive axes or an error of the gear ratio of a reducer. In a known method of the related art, such items are set as mechanism error parameters and a value is set for each of the mechanism error parameters (see Japanese Unexamined Patent Publication No. 2008-12604A and Japanese Unexamined Patent Publication No. 2012-196716A).

SUMMARY OF THE INVENTION

The controller of the robot can adjust the rotation angle of a drive motor for driving each component, based on a mechanism error parameter. By correctly setting the mechanism error parameters for the robot, the actual position and orientation of the robot can be brought close to the position and the orientation that are specified in the motion program.

For example, in the replacement of parts constituting the robot, it is necessary to calibrate the mechanism error parameters. In other words, it is necessary to reset the mechanism error parameters. In the calibration of mechanism error parameters according to the related art, control is performed so as to calculate all the mechanism error parameters. When the mechanism error parameters are calculated, the actual position of the robot is detected by a camera mounted on a wrist of the robot or a three-dimensional measuring device disposed at a position remote from the robot. The robot is driven so as to change the position of the robot, enabling measurement of a large number of actual positions of the robot. Subsequently, the mechanism error parameters are calculated based on the actual positions of the robot.

In the controller of the robot, however, a large number of mechanism error parameters are set. Thus, it is necessary to drive the robot at quite a large number positions in order to calculate all the mechanism error parameters. Moreover, if all the mechanism error parameters are calibrated, it is necessary to drive the robot over the motion range in which the robot can drive. However, a robot in a factory or the like may be driven in a limited range. For example, a fence or other apparatuses disposed around the robot may reduce a range for driving the robot. If the robot is driven so as to measure the actual position of the robot in such a small range, the mechanism error parameters may not be correctly calculated. This may lead to insufficient improvement in the accuracy of robot control.

Furthermore, a large number of mechanism error parameters are set for the controller of the robot, thus it is necessary to drive the robot at multiple positions in order to measure the actual position of the robot. Thus, even if only some of the parts are replaced, the calibration of the mechanism error parameters requires a long operation time. Consequently, a robot device may become unusable for a long time, disadvantageously reducing the productivity of the factory.

An aspect of the present disclosure is a calibration apparatus for calibrating a mechanism error parameter for adjusting the control of a robot based on a motion program. The calibration apparatus includes a parameter setting unit configured to invalidate first mechanism error parameter from among a plurality of mechanism error parameters. The calibration apparatus includes a measurement control unit configured to drive the robot with a plurality of orientations at a plurality of positions by using second mechanism error parameter other than the first mechanism error parameter and acquire the actual measurement position of the robot measured by a three-dimensional measuring device and information on the status of the robot when the actual measurement position is measured. The calibration apparatus includes a storage unit that stores combined information on the actual measurement position of the robot measured by the three-dimensional measuring device and the information on the status of the robot. The calibration apparatus includes a parameter calculation unit configured to calculate the first mechanism error parameter based on the actual measurement position of the robot and the information on the status of the robot. The calibration apparatus includes a correction unit configured to change the first mechanism error parameter invalidated by the parameter setting unit to the first mechanism error parameter calculated by the parameter calculation unit, without changing the second mechanism error parameter in the plurality of the mechanism error parameters.

DETAILED DESCRIPTION OF THE INVENTION

Referring to FIGS. 1 to 5, a calibration apparatus according to an embodiment will be described below. The calibration apparatus of the present embodiment is disposed in a robot device including a robot. The calibration apparatus calibrates mechanism error parameters for adjusting the control of the robot.

Figure 1:
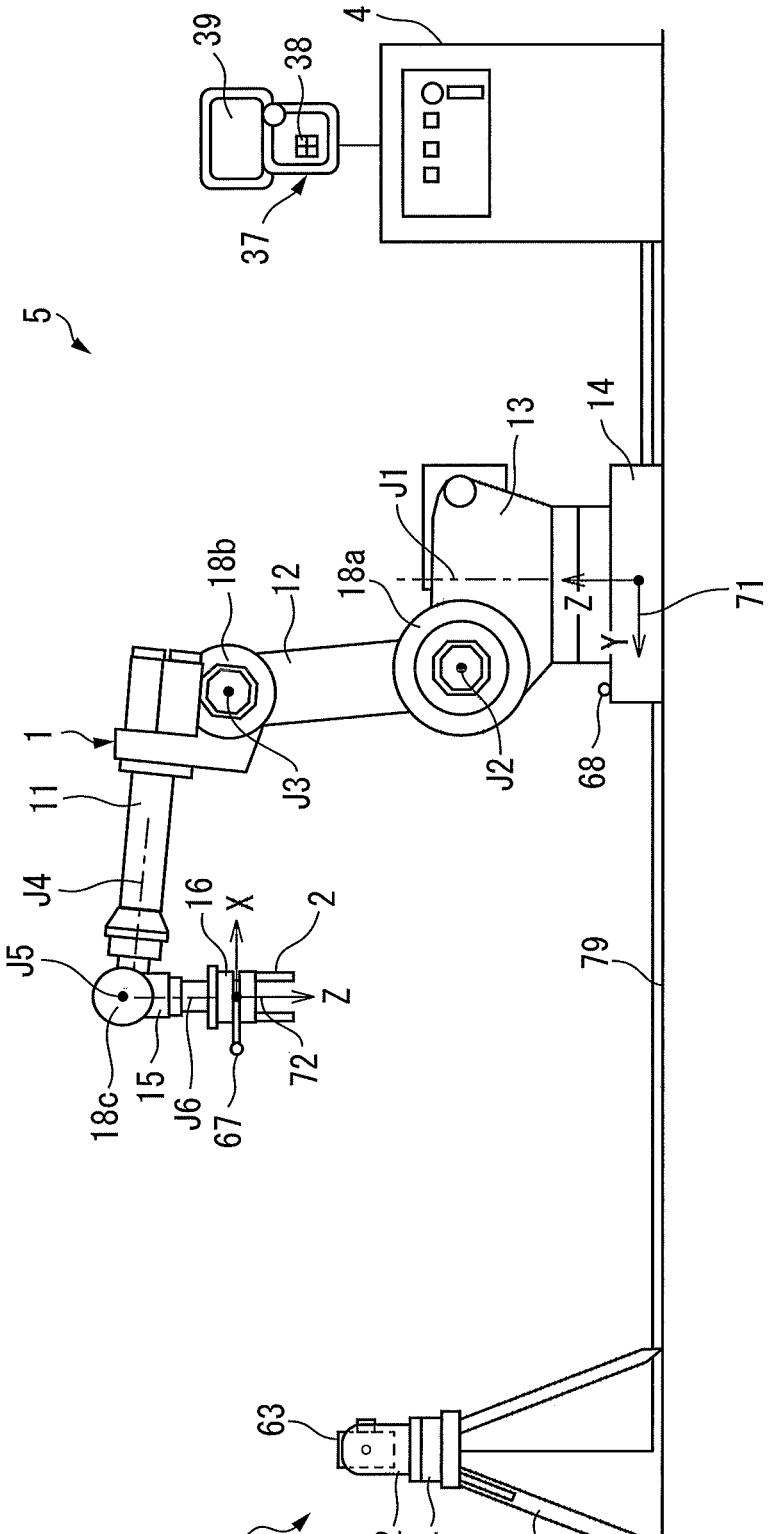
FIG. 1 is a schematic diagram of a robot device according to an embodiment.

FIG. 1 is a schematic diagram of the robot device according to the present embodiment. A robot device 5 includes a hand 2 acting as an operation tool and a robot 1 that moves the hand 2. The robot 1 of the present embodiment is an articulated robot including joints 18a, 18b, and 18c. The robot 1 includes a plurality of movable components. The components of the robot 1 are respectively formed so as to rotate about drive axes J1 to J6.

The robot 1 includes a base part 14 fixed to an installation surface 79 and a turning base 13 supported by the base part 14. The turning base 13 rotates about the drive axis J1 relative to the base part 14. The robot 1 includes an upper arm 11 and a lower arm 12. The lower arm 12 is supported so as to rotate about the drive axis J2 relative to the turning base 13. The upper arm 11 is supported so as to rotate about the drive axis J3 relative to the lower arm 12. The upper arm 11 also rotates about the drive axis J4. The robot 1 includes a wrist 15 supported by the upper arm 11. The wrist 15 rotates about the drive axis J5. The wrist 15 includes a flange 16 that rotates about the drive axis J6. The hand 2 is fixed to the flange 16.

The robot of the present embodiment is a vertical articulated robot including six drive axes, but the embodiment is not limited to this. A robot that changes its position and orientation with any mechanism may be used. The operation tool of the present embodiment is the hand for gripping a workpiece, but the embodiment is not limited to this. An operator can select an operation tool according to an operation performed by the robot device. For example, the operation tool may be an operation tool for welding or an operation tool for applying adhesive.

In the robot device 5 of the present embodiment, a reference coordinate system 71 is set. In the example of FIG. 1, the origin of the reference coordinate system 71 is disposed in the base part 14 of the robot 1. The reference coordinate system 71 is also referred to as a world coordinate system. The reference coordinate system 71 is a coordinate system where the position of the origin is fixed and the directions of coordinate axes are fixed. Even if the position and orientation of the robot 1 are changed, the position and orientation of the reference coordinate system 71 remain unchanged. The reference coordinate system 71 has, as coordinate axes, the X-axis, the Y-axis, and the Z-axis that are orthogonal to one another. Moreover, the W-axis is set as a coordinate axis around the X-axis. The P-axis is set as a coordinate axis around the Y-axis. The R-axis is set as a coordinate axis around the Z-axis.

In the present embodiment, a flange coordinate system 72 is set with the origin disposed on the surface of the flange 16 of the wrist 15. The flange coordinate system 72 is also referred to as a mechanical interface coordinate system. The flange coordinate system 72 rotates or moves with the flange 16. The origin of the flange coordinate system 72 is set on the drive axis J6 of the robot 1. The flange coordinate system 72 has, as coordinate axes, the X-axis, the Y-axis, and the Z-axis that are orthogonal to one another. In the example of FIG. 1, the flange coordinate system 72 is set such that the Z-axis extends in parallel with the extending direction of the drive axis J6. Moreover, the flange coordinate system 72 has the W-axis around the X-axis, the P-axis around the Y-axis, and the R-axis around the Z-axis. The position of the robot 1 corresponds to the position of the origin of the flange coordinate system 72 in the reference coordinate system 71. Moreover, the orientation of the robot 1 corresponds to the orientation of the flange coordinate system 72 with respect to the reference coordinate system 71.

Figure 2:
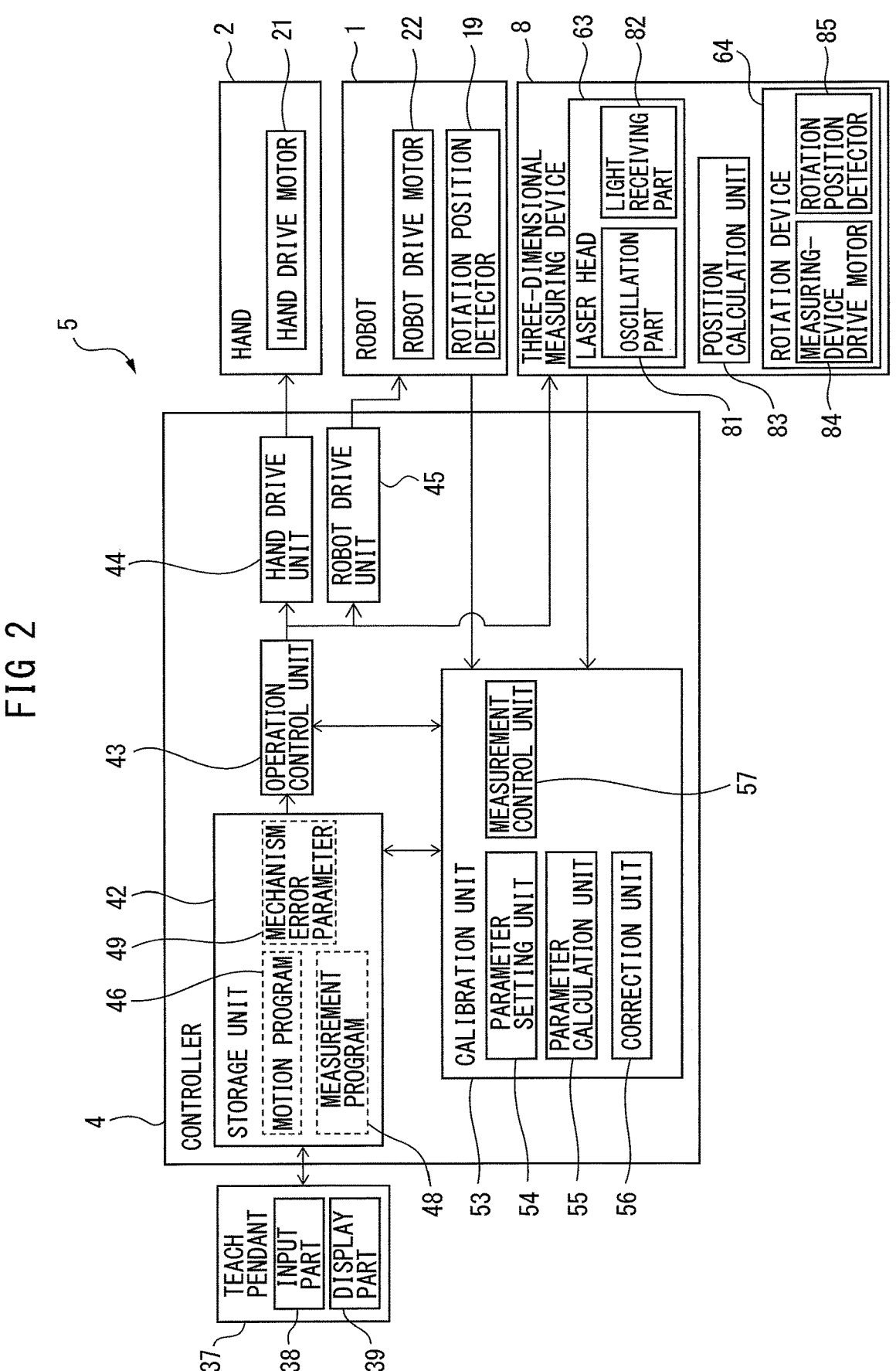
FIG. 2 is a block diagram of the robot device.

FIG. 2 is a block diagram illustrating the robot device according to the present embodiment. Referring to FIGS. 1 and 2, the robot 1 includes a robot drive device that changes the position and orientation of the robot 1. The robot drive device includes robot drive motors 22 that drive components including the upper arm 11, the lower arm 12, the wrist 15, etc. In the present embodiment, a plurality of robot drive motors 22 are disposed for the respective drive axes J1 to J6. The robot drive motor 22 drives so as to change the orientation of the component.

The hand 2 includes a hand drive device that drives the hand 2. The hand drive device includes a hand drive motor 21 that drives the claws of the hand 2. The hand drive motor 21 drives so as to open or close the claws of the hand 2. The hand may be formed so as to be driven by air pressure or the like.

The robot device 5 includes a controller 4 that controls the robot 1 and the hand 2 and a teach pendant 37 that allows an operator to operate the controller 4. The controller 4 includes an arithmetic processing device (computer) having a central processing unit (CPU) as a processor. The controller 4 includes random access memory (RAM), read only memory (ROM), etc. that are connected to the CPU via a bus.

The teach pendant 37 includes an input part 38 for inputting information on the robot 1 and the hand 2. The input part 38 includes operation parts such as a keyboard and a dial. The operator can input, for example, a motion program, the set value of a variable number, and the judgement value of a variable number from the input part 38 to the controller 4. The teach pendant 37 includes a display part 39 that displays information on the robot 1 and the hand 2. The display part 39 includes a display such as a liquid crystal display panel.

A motion program 46 created in advance for controlling the robot 1 and the hand 2 is inputted to the controller 4. Alternatively, the operator operates the teach pendant 37 so as to drive the robot 1, thereby setting the teaching points of the robot 1. The controller 4 can generate the motion program 46 for driving the robot 1 and the hand 2 based on the teaching points. The controller 4 includes a storage unit 42 that stores information on the control of the robot 1 and the hand 2. The storage unit 42 may be formed by a storage medium that is capable of storing information, such as a volatile memory, a nonvolatile memory, a hard disk, and the like. The motion program 46 is stored in the storage unit 42. The robot device 5 automatically performs an operation based on the motion program 46.

The controller 4 includes a motion control unit 43 that transmits a motion command to the robot 1 and the hand 2. The motion control unit 43 transmits the motion command for driving the robot 1 to a robot drive unit 45 based on the motion program 46. The motion control unit 43 is equivalent to a processor driven according to the motion program 46. The processor reads the motion program 46 and performs control as defined in the motion program 46, so that the processor acts as the motion control unit 43.

The robot drive unit 45 includes an electric circuit that drives the robot drive motor 22. The robot drive unit 45 supplies electricity to the robot drive motors 22 based on the

6 orientation that are specified in the motion program 46. In the present embodiment, a plurality of mechanism error parameters 49 for adjusting the control of the robot 1 are set in addition to the motion program 46. The mechanism error parameters 49 are stored in the storage unit 42.

The mechanism error parameters 49 include an arbitrary parameter that causes an error of the position and orientation when the robot 1 is driven. For example, the mechanism error parameters 49 include the parameters of a link length between the drive axes, the respective positions of the drive axes, a gear ratio error caused by backlash occurring in the reducers of the respective drive axes, and a variable number for the elastic deformation of a link that is deformed due to the influence of gravity. Table 1 shows examples of the mechanism error parameters.

TABLE 1

| | Mechanism error parameter | | | | | | |
|---|---|---|---|---|---|---|---|
| Symbol | Parameter | J1 | J2 | J3 | J4 | J5 | J6 |
| P1 | DH-θ | S | × | S | S | S | S |
| P2 | DH-D | S | — | — | S | — | S |
| P3 | DH-A | S | × | S | — | S | — |
| P4 | DH-α | — | × | — | S | S | S |
| P5 | Spring constant θ in a first direction | S | × | S | — | S | S |
| P6 | Spring constant α in a second direction | — | × | S | S | — | S |
| P7 | Spring constant β in a third direction | S | × | — | S | S | S |
| P8 | Gear ratio error | S | × | S | S | S | — |

S: Set at the shipment of the robot
—: Not set at the shipment of the robot
x: Invalidated for calibration motion command. The motion control unit 43 transmits the motion command for driving the hand 2 to a hand drive unit 44 based on the motion program 46. The hand drive unit 44 includes an electric circuit that drives the hand drive motor 21. The hand drive unit 44 supplies electricity to the hand drive motor 21 based on the motion command.

The robot 1 includes a status detector for detecting a status of the robot 1, which includes the position and orientation of the robot 1. The status detector of the present embodiment includes a rotation position detector 19 that is attached to the robot drive motor 22 corresponding to the drive axis of the arm or the like. The rotation position detector 19 is formed by an encoder that detects the rotation angle of the robot drive motor 22 and the like. In the present embodiment, the position and orientation of the robot 1 are detected based on the outputs of a plurality of the position detectors 19.

The motion control unit 43 controls the robot 1 to the position and orientation specified in the motion program 46. The motion control unit 43 controls the rotation angle of the robot drive motor 22 based on, for example, inverse kinematics. A tool coordinate system can be set at the tip of the operation tool so as to correspond to the flange coordinate system 72. The position and orientation of the flange coordinate system 72 correspond to the position and orientation of the tool coordinate system. The robot 1 is controlled so as to set the flange coordinate system 72 to a desired position and orientation, thereby controlling the operation tool to a desired position and orientation.

Because of a manufacturing error of the robot components, an assembling error during the assembly of the robot, the influence of gravity, etc., the actual position and orientation of the robot may be deviated from the position and the The mechanism error parameters of the present embodiment include DH parameters denoted as symbols P1 to P4. In a Denavit Hartenberg (DH) method, a coordinate system is set for each drive axis and the position and orientation of the robot can be expressed based on the relationship between the coordinate systems of the drive axes. The DH parameters are parameters in the DH method and include, for example, parameters DH-θ, DH-D, DH-A, and DH-α.

The mechanism error parameters of the present embodiment include the spring constants relating torque around the drive axes, which are determined by the Newton-Euler method. The spring constants are the parameters relating to amounts of deflection with respect to the torque. The spring constants are denoted as symbols P5 to P7. The mechanism error parameters include the spring constant θ in the first direction, the spring constant α in the second direction, and the spring constant β in the third direction on each of the drive axes.

Moreover, an error may occur between the output of the rotation position detector 19 attached to the robot drive motor 22 disposed on each of the drive axes and a rotation angle actually transmitted to the arm or the like. The error of the angle occurs due to, for example, a gear ratio error in the reducer. The mechanism error parameters of the present embodiment include a gear ratio error of the reducer. The gear ratio error is denoted as symbol P8.

The mechanism error parameters are not limited to these parameters. Any parameter can be set for adjusting the control of the robot. The mechanism error parameters are set according to the installation location of the robot 1 when the robot 1 shipped. The mechanism error parameters can be set for the respective drive axes J1 to J6. The mechanism error parameters 49 are stored in file format in the storage unit 42.

Referring to FIG. 2, the motion control unit 43 calculates the rotation angle of the robot drive motor 22 such that the robot 1 is placed with the orientation at the position as set in the motion program 46 based on inverse kinematics. At this point, the motion control unit 43 acquires the mechanism error parameters 49 stored in the storage unit 42. The motion control unit 43 corrects the motion commands of the robot drive motors 22 based on the mechanism error parameters. This control can bring the position and orientation of the robot close to the position and the orientation that are specified in the motion program 46.

The calibration apparatus of the present embodiment calibrates the mechanism error parameters for adjusting the control of the robot 1. In the present embodiment, the controller 4 acts as a calibration apparatus. The robot device 5 includes a three-dimensional measuring device 8 for correctly measuring the position and orientation of the robot 1. The three-dimensional measuring device 8 of the present embodiment is disposed at a position remote from the robot 1.

Figure 3:
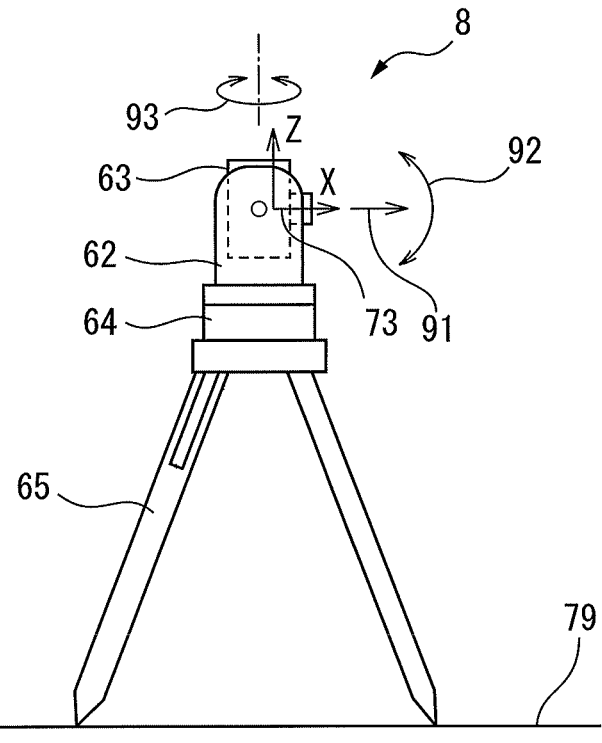
FIG. 3 is a side view of a three-dimensional measuring device according to the embodiment.

FIG. 3 is an enlarged view of the three-dimensional measuring device according to the present embodiment. Referring to FIGS. 1 to 3, the three-dimensional measuring device 8 according to the present embodiment performs laser beam oscillation and receives a laser beam reflected from a reflector 67 or a reflector 68 that is attached to the robot 1. The three-dimensional measuring device 8 includes a laser head 63 for laser beam oscillation indicated by an arrow 91. The laser head 63 is supported by a support member 62. The laser head 63 includes an oscillation part 81 for laser beam oscillation. The oscillation part 81 is formed by a member that emits a laser beam. The laser head 63 includes a light receiving part 82 that receives a laser beam reflected from the reflector 67 or the reflector 68. The light receiving part 82 is formed by a member that receives a laser beam, for example, a light receiving element. The light receiving part 82 is disposed in the laser head 63.

The three-dimensional measuring device 8 of the present embodiment includes a rotation device 64 that changes the orientation of the laser head 63. The rotation device 64 includes a measuring-device drive motor 84 that changes the orientation of the laser head 63. A rotation position detector 85 such as an encoder is attached to the measuring-device drive motor 84 in order to detect the rotation angle of the measuring-device drive motor 84. As indicated by an arrow 92, the rotation device 64 rotates the laser head 63 about a rotary axis extending in the horizontal direction. As indicated by an arrow 93, the rotation device 64 also rotates the support member 62 about a rotary axis extending in the vertical direction. The rotation device 64 is supported by a tripod 65. In this way, the three-dimensional measuring device 8 enables laser beam oscillation in any direction by driving the rotation device 64.

The three-dimensional measuring device 8 includes an arithmetic processing device that includes a CPU acting as a processor, RAM, etc. The arithmetic processing device of the three-dimensional measuring device 8 includes a position calculation unit 83 that calculates the positions of the reflectors 67 and 68. The position calculation unit 83 is equivalent to a processor driven according to a predetermined program. The processor reads the program and performs control as defined in the program, so that the processor acts as the position calculation unit 83.

The position calculation unit 83 calculates distances from the three-dimensional measuring device 8 to the reflectors 67 and 68 according to a phase difference between an oscillated laser beam and a received laser beam. The position calculation unit 83 can calculate the positions of the reflectors 67 and 68 according to a distance from the three-dimensional measuring device 8 to the reflectors 67 and 68 and the orientation of the laser head 63.

In the three-dimensional measuring device 8 of the present embodiment, a measuring-device coordinate system 73 is set. The measuring-device coordinate system 73 is set in the controller 4 as a user coordinate system that can be set at any position by an operator. The origin of the measuring-device coordinate system 73 can be set at any position in the three-dimensional measuring device 8. For example, the origin of the measuring-device coordinate system 73 can be placed at the front end of a laser beam source disposed in the laser head 63.

The measuring-device coordinate system 73 has, as coordinate axes, the X-axis, the Y-axis, and the Z-axis that are orthogonal to one another. The measuring-device coordinate system 73 can be set in any orientation. Moreover, the W-axis, the P-axis, and the R-axis are set as coordinate axes around the X-axis, the Y-axis, and the Z-axis, respectively. In the present embodiment, the Z-axis is set in parallel with the vertical direction. The measuring-device coordinate system 73 is a coordinate system where the position of the origin is fixed and the directions of the coordinate axes are fixed. Even if the orientation of the laser head 63 changes, the position and orientation of the measuring-device coordinate system 73 remain the same.

In first control for updating the mechanism error parameters according to the present embodiment, the position and orientation of the three-dimensional measuring device 8 relative to the robot 1 are determined in advance. In other words, the position and orientation of the measuring-device coordinate system 73 relative to the reference coordinate system 71 are determined in advance. A method of detecting the position and orientation of the measuring-device coordinate system 73 relative to the reference coordinate system 71 will be described below.

Referring to FIG. 1, the robot 1 of the present embodiment has the reflector 68 for detecting the position and orientation of the measuring-device coordinate system 73 relative to the reference coordinate system 71. The reflector 68 of the present embodiment is fixed to the surface of the base part 14.

The reflector 68 is formed in a spherical shape. The reflector 68 is formed so as to reflect a laser beam in the same direction as an incoming laser beam. In other words, the reflector 68 reflects a laser beam such that the reflected laser beam travels opposite to the direction of an incoming laser beam. The position of the reflector 68 relative to the reference coordinate system 71 is determined in advance. In other words, the coordinate values of the reflector 68 in the reference coordinate system 71 are determined in advance.

The rotation device 64 of the three-dimensional measuring device 8 adjusts the orientation of the laser head 63 such that a laser beam returns to the laser head 63 after being reflected from the reflector 68. An operator can manually drive the rotation device 64 so as to adjust the orientation of the laser head 63. Alternatively, the three-dimensional measuring device 8 may have an automatic search function of scanning with a laser beam directed in a circular shape. In this case, the operator adjusts the orientation of the laser head 63 to the approximate orientation in which a laser beam is emitted from the three-dimensional measuring device 8 to the reflector 68. Thereafter, the three-dimensional measuring device 8 can adjust the orientation of the laser head 63 by the automatic search function such that a laser beam reflected from the reflector 68 returns to the laser head 63.

The rotation device 64 can detect the orientation of the laser head 63 in the measuring-device coordinate system 73 based on the output of the rotation position detector 85. The position calculation unit 83 calculates a distance from the three-dimensional measuring device 8 to the reflector 68 by receiving light reflected from the reflector 68. Furthermore, the position calculation unit 83 can calculate the position of the reflector 68 in the measuring-device coordinate system 73 based on the calculated distance and the orientation of the laser head 63. Since the position of the reflector 68 in the reference coordinate system 71 is determined in advance, the position calculation unit 83 can calculate the position and orientation of the measuring-device coordinate system 73 relative to the reference coordinate system 71. In this way, the position and orientation of the measuring-device coordinate system 73 can be set in advance. In the present embodiment, the position and orientation of the measuring-device coordinate system 73 are calculated based on reflected light from the single reflector 68, but the embodiment is not limited to this. The position and orientation of the measuring-device coordinate system may be calculated based on reflected light from a plurality of reflectors disposed on, for example, the base part of the robot.

Figure 4:
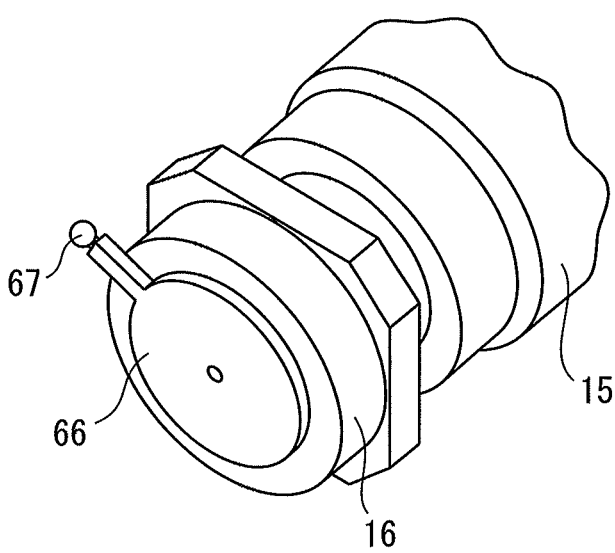
FIG. 4 is an enlarged perspective view illustrating the flange of a wrist according to the embodiment.

FIG. 4 is a perspective view of the reflector attached to the flange at the tip of the robot. FIG. 4 shows a state in which the hand 2 is detached. The reflector 67 for measuring the position of the measuring-device coordinate system 73 relative to the flange coordinate system 72 is fixed to the flange 16 of the robot 1. The reflector 67 has the same configuration as the reflector 68. The reflector 67 is formed in a spherical shape. The reflector 67 is formed so as to reflect a laser beam in the incident direction. The reflector 67 is fixed to the flange 16 via the support member 66.

In the first control for updating the mechanism error parameters, the support member 66 is formed so as to fix the position of the reflector 67 in the flange coordinate system 72. In other words, the position of the reflector 67 relative to the origin of the flange coordinate system 72 is determined in advance.

Referring to FIG. 2, the controller 4 includes a calibration unit 53 that calibrates the mechanism error parameters. The calibration unit 53 is equivalent to a processor driven according to the motion program 46. The processor reads the motion program 46 and performs control as defined in the motion program 46, so that the processor acts as the calibration unit 53. As will be described later, the calibration unit 53 includes a parameter setting unit 54, a parameter calculation unit 55, a correction unit 56, and a measurement control unit 57. Each of the parameter setting unit 54, the parameter calculation unit 55, the correction unit 56, and the measurement control unit 57 is equivalent to the processor driven according to the motion program 46. The processor performs control as defined in the motion program 46, so that the processor acts as the respective units.

The calibration unit 53 invalidates a part of the mechanism error parameters as first mechanism error parameter. The calibration unit 53 drives the robot 1 to multiple positions and orientations by using second mechanism error parameter other than the first mechanism error parameter. The calibration unit 53 measures an actual measurement position as an actual position of the robot 1 by the three-dimensional measuring device 8. At this point, the calibration unit 53 acquires information on the status of the robot 1, which includes the rotation angle of the robot drive motors 22.

The calibration unit 53 then stores combined information on the actual measurement position of the robot 1 and the information on the status of the robot 1. The calibration unit 53 calculates the invalidated first mechanism error parameter based on the combined information. Subsequently, the invalidated first mechanism error parameter is changed to the calculated first mechanism error parameter without changing the second mechanism error parameter, and then another file of the mechanism error parameters is created.

Figure 5:
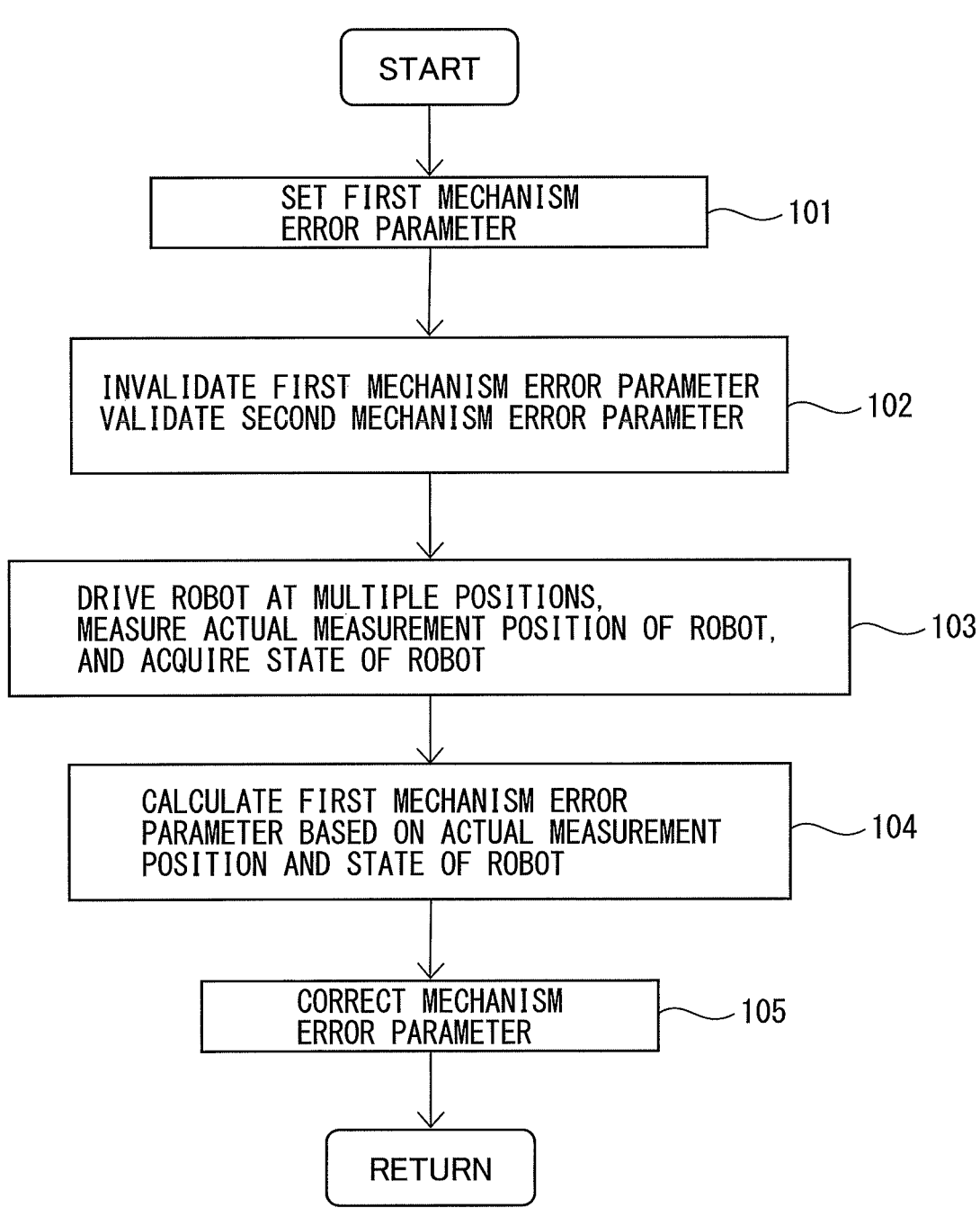
FIG. 5 is a flowchart of the control of the robot device.

FIG. 5 is a flowchart of the control of the calibration apparatus according to the present embodiment. The calibration control according to the present embodiment can be performed in the replacement of the components of the robot 1. For example, the calibration control can be performed when the robot drive motor 22, the lower arm 12, or the upper arm 11 is replaced. Alternatively, the calibration control can be performed when a reducer for reducing the rotation speed of the robot drive motor 22 is replaced. The calibration control according to the present embodiment can be also performed in the event of a collision between the components such as the upper arm 11 and other devices or objects.

Referring to Table 1, an example of the replacement of the components such as a reducer for the drive axis J2 will be described in the present embodiment. Referring to FIGS. 2 to 5, in step 101, the first mechanism error parameters to be invalidated are set from among the mechanism error parameters. The calibration unit 53 includes the parameter setting unit 54 that sets some of the mechanism error parameters as the first mechanism error parameters and invalidates the first mechanism error parameters.

The first mechanism error parameters for invalidating the adjustment of control can be set in advance by an operator. The first mechanism error parameters can be set in a reference file and stored in the storage unit 42. The parameter setting unit 54 acquires the reference file from the storage unit 42 and sets the first mechanism error parameters. In the example of Table 1, for the drive axis J2, all the mechanism error parameters set at the shipment of the robot 1 are selected as the first mechanism error parameters.

The parameter setting unit 54 sets the mechanism error parameters other than the first mechanism error parameters as the second mechanism error parameters. In the example of Table 1, the mechanism error parameters set for the drive axes J1, J3, J4, J5, and J6 are set as the second mechanism error parameters.

The parameter setting unit 54 is not limited to this configuration and can set the first mechanism error parameters under any control. For example, the teach pendant 37 displays a list of the mechanism error parameters on the display part 39. The operator then operates the input part 38 so as to select the first mechanism error parameters to be invalidated. The parameter setting unit 54 can acquire the input of the operator and set the first mechanism error parameters.

Subsequently, in step 102, the parameter setting unit 54 invalidates the first mechanism error parameters. Moreover, the parameter setting unit 54 validates the second mechanism error parameters.

Subsequently, in step 103, the robot 1 is driven to multiple positions by using the second mechanism error parameters. The calibration unit 53 includes a measurement control unit 57 that drives the robot 1 to multiple positions and orientations by using the second mechanism error parameters. The measurement control unit 57 transmits the motion commands of the robot 1 and the three-dimensional measuring device 8 to the motion control unit 43. A measurement program 48 for measuring the actual measurement position of the robot 1 is created in advance by an operator. The measurement program 48 is stored in the storage unit 42.

The measurement control unit 57 changes the position and orientation of the robot 1 based on the measurement program 48. At this point, the measurement control unit 57 drives the robot 1 without using the first mechanism error parameters. The measurement control unit 57 measures the actual measurement position of the robot 1 according to each of the positions and orientations of the robot 1 by the three-dimensional measuring device 8. The measurement control unit 57 also acquires information on the status of the robot 1 when the actual measurement position is measured. The information on the status of the robot 1 includes the rotation positions of the robot drive motors 22.

The number of measurement points for measuring the actual measurement positions of the robot 1 preferably ranges from several tens to several hundreds. The measurement points for measuring the actual measurement positions of the robot 1 (the position and orientation of the robot 1) can be determined by any method. For example, the measurement points can be set so as to be evenly scattered in the motion range of the robot 1. Alternatively, the measurement points can be set on a path set in the motion program 46. In other words, the measurement points can be set to the positions and orientations of the robot 1 driven by the motion program 46. By setting the measurement points on the path set in the motion program 46, a deviation of the position and orientation of the robot 1 can be reduced when the motion program 46 is executed.

Referring to FIG. 1, the position of the robot 1 corresponds to the position (the position of the origin) of the flange coordinate system 72. The position of the reflector 67 is determined relative to the position of the flange coordinate system 72. The three-dimensional measuring device 8 measures the position of the reflector 67 according to the same method as in the measurement of the position of the reflector 68.

For example, the position and orientation of the three-dimensional measuring device 8 relative to the reference coordinate system 71 are determined in advance, and thus the measurement control unit 57 calculates the position of the reflector 67 based on information on the rotation angle of the robot drive motor 22. The measurement control unit 57 calculates the coordinate values of the reflector 67 in the reference coordinate system 71. The rotation device 64 of the three-dimensional measuring device 8 then adjusts the orientation of the laser head 63 so as to emit a laser beam to the reflector 67 based on the coordinate values of the reflector 67 in the reference coordinate system 71. The three-dimensional measuring device 8 adjusts the orientation of the laser head 63 such that a laser beam reflected from the surface of the reflector 67 is received by the automatic search function. The position calculation unit 83 can calculate the position of the reflector 67 in the measuring-device coordinate system 73 based on a distance from the three-dimensional measuring device 8 to the reflector 67 and the orientation of the laser head 63.

The position and orientation of the measuring-device coordinate system 73 relative to the reference coordinate system 71 are determined in advance. Thus, the position calculation unit 83 can calculate the position of the reflector 67 in the reference coordinate system 71 based on the position of the reflector 67 in the measuring-device coordinate system 73. Furthermore, the position calculation unit 83 can calculate the position of the origin of the flange coordinate system 72 based on the position of the reflector 67. In other words, the position calculation unit 83 can calculate an actual measurement position that is an actual position of the robot 1. In the present embodiment, the actual measurement position of the robot 1 is calculated based on reflected light from the single reflector 67, the embodiment is not limited to this. The actual measurement position of the robot may be calculated based on reflected light from a plurality of reflectors disposed on the flange or the like.

The measurement control unit 57 acquires the actual measurement position of the robot 1 from the three-dimensional measuring device 8. The storage unit 42 stores combined information on the actual measurement position of the robot 1 at the single measurement point and the information on the status of the robot 1. The measurement control unit 57 measures the actual measurement positions of the robot 1 at multiple measurement points and stores combined information on the actual measurement position of the robot 1 and the information on the status of the robot 1 in the storage unit 42.

Referring to FIGS. 2 and 5, in step 104, the first mechanism error parameters invalidated in step 102 are calculated. The calibration unit 53 includes the parameter calculation unit 55 configured to calculate the first mechanism error parameter based on the actual measurement position of the robot and the information on the status of the robot. The parameter calculation unit 55 can calculate the first mechanism error parameters according to any method based on information on a large number of the measurement points.

Referring to Table 1, in this example, seven mechanism error parameters are calculated for the drive axis J2. The parameter calculation unit 55 can calculate the position of the robot 1 based on the output of the rotation position detector 19 at each measurement point and all the mechanism error parameters. In the present embodiment, the position of the robot 1 will be referred to as a calculation position. For example, the parameter calculation unit 55 can calculate the first mechanism error parameter according to the method of least squares such that an error of the calculation position relative to the actual measurement position is reduced at multiple measurement points.

Subsequently, in step 105, the mechanism error parameters are corrected. The calibration unit 53 includes the correction unit 56 that corrects the mechanism error parameter. The correction unit 56 changes the first mechanism error parameter invalidated by the parameter setting unit 54 to the first mechanism error parameter calculated by the parameter calculation unit 55, without changing the second mechanism error parameter. Referring to Table 1, for example, the correction unit 56 changes the mechanism error parameters invalidated for calibration on the drive axis J2 to the mechanism error parameters calculated by the parameter calculation unit 55. The mechanism error parameters for the drive axes J1, J3, J4, J5, and J6 other than the drive axis J2 have the same values as values used before correction.

As described above, the calibration apparatus of the present embodiment drives the robot 1 after invalidating a part of the mechanism error parameters, and then calculates the invalidated mechanism error parameter based on the actual measurement positions of the robot 1, thereby calibrating the mechanism error parameter. The calibration apparatus of the present embodiment updates a part of the mechanism error parameters among a plurality of mechanism error parameters, thereby reducing the number of measurement points for measuring the actual measurement positions as compared with an update of all the mechanism error parameters. For example, in the case of a robot device installed in a factory or the like, apparatuses or a fence around the robot device may limit the motion range of a robot. Thus, the number of measurement points may be limited. Also, in this case, the calibration apparatus of the present embodiment can calibrate the mechanism error parameters.

Moreover, the calibration apparatus of the present embodiment can reduce the number of measurement points and thus shorten a time period during which the robot 1 is driven and the actual measurement positions are measured by the three-dimensional measuring device 8. This can shorten the operation time for calibrating the mechanism error parameters. The downtime of the robot device 5 can be reduced. Thus, a deterioration of the productivity of the factory can be suppressed.

A part of the mechanism error parameters that are set to the first mechanism error parameters among a plurality of the mechanism error parameters for invalidating the adjustment of control can be set by various methods. For example, the storage unit 42 can store, as parameter information, the first mechanism error parameters to be invalidated according to the reason for calibration. The parameter information can be stored in the reference file. The parameter setting unit 54 can set, as the first mechanism error parameters, the mechanism error parameters defined in the parameter information. For example, parameter information in the replacement of the robot drive motor of a predetermined drive axis, parameter information in the replacement of a predetermined arm, and parameter information in the event of a collision of a predetermined component with other objects may be created in advance and stored in the storage unit 42. The parameter setting unit 54 can set the first mechanism error parameters according to the reason for calibration. For example, the operator inputs the reason for calibration on the teach pendant 37, allowing the parameter setting unit 54 to automatically set the first mechanism error parameters.

The parameter information particularly in the replacement of a component of the robot 1 may include the first mechanism error parameters to be invalidated in response to the replacement of the component of the robot 1. The parameter setting unit 54 then acquires information on the replaced component of the robot 1. The parameter setting unit 54 can set the first mechanism error parameters based on the replaced component of the robot 1. With this configuration, the operator inputs the information on the replaced component of the robot 1, thereby automatically selecting the first mechanism error parameters.

In the example of Table 1, the parts of the drive axis J2 are replaced and thus all of the mechanism error parameters for the drive axis J2 are invalidated. In other words, for each drive axis, the parameter setting unit 54 sets the mechanism error parameters to be invalidated and the mechanism error parameters to be validated, but the embodiment is not limited to this. The parameter setting unit 54 can invalidate any set of the mechanism error parameters.

For example, a part of the mechanism error parameters may be invalidated among the mechanism error parameters relating to one drive axis. The priority of invalidation may be determined in advance for the mechanism error parameters corresponding to one drive axis. For example, the number of measurement points for measuring the actual measurement positions may not be sufficiently increased because of a small motion range of the robot 1. In this case, the mechanism error parameters of high priority may be invalidated. Referring to Table 1, for example, the parameter DH-A of the drive axis J2 is placed at a low priority in the replacement of the transmission of the drive axis J2 and thus the parameter DH-A may be set as the second mechanism error parameter.

In Table 1, the mechanism error parameters for one drive axis are invalidated, but the embodiment is not limited to this. The mechanism error parameters relating to multiple drive axes may be invalidated. For example, in the replacement of the lower arm 12, the mechanism error parameter for the drive axis J2 and the mechanism error parameter for the drive axis J3 can be set as the first mechanism error parameters. Furthermore, in Table 1, the mechanism error parameters to be invalidated are set for each of the drive axes, but the embodiment is not limited to this. The mechanism error parameters set as the first mechanism error parameters may be selected regardless of the drive axes.

Alternatively, the operator may increase or reduce the first mechanism error parameters based on the calibration results of the mechanism error parameters. For example, the parameter calculation unit 55 can calculate a calculation position based on the calculated first mechanism error parameters and the information on the status of the robot. The parameter calculation unit 55 can calculate an error of the calculation position relative to the actual measurement position at each of the measurement points. If the mean value of errors is large, the operator may reduce the number of first mechanism error parameters.

Moreover, the parameter setting unit 54 may automatically select the first mechanism error parameters. For example, a large number of mechanism error parameters can be initially set as the first mechanism error parameters. The parameter calculation unit 55 calculates the first mechanism error parameters. The parameter setting unit 54 then deletes the mechanism error parameters one by one based on the priority of the mechanism error parameters. The parameter calculation unit 55 calculates the first mechanism error parameters. A plurality of kinds of first mechanism error parameters can be calculated by repeating the control. The parameter calculation unit 55 can calculate the mean value of errors of calculation positions relative to actual measurement positions at all the measurement points by using each of the first mechanism error parameters. The correction unit 56 can employ the first mechanical error parameter with the minimum mean value of errors of calculation positions relative to the actual measurement positions. In this way, the first mechanism error parameters can be manually selected by the operator or may be automatically selected.

When the robot 1 is driven using the second mechanism error parameters in order to measure the actual measurement position of the robot 1, the drive axis for driving the robot 1 can be selected by any method. For example, in the measurement program 48, the measurement points can be set so as to drive the robot 1 at all the drive axes. With this configuration, the first mechanism error parameters can be calibrated with high accuracy. The robot 1 can be accurately driven with various orientations at various positions.

Alternatively, information on the drive axis of the robot 1 relating to each of the mechanism error parameters can be determined in advance. The storage unit 42 can store the information as drive axis information. The measurement control unit 57 can drive the robot 1 so as to drive the drive axis associate with the first mechanism error parameters from among the drive axes of the robot 1 and stop the drive axis other than the drive axis associated with the first mechanism error parameters. For example, if the values of the mechanism error parameters relating to the drive axis J2 are changed, the actual measurement positions can be measured by driving only the robot drive motor 22 of the drive axis J2. The number of measurement points for measuring the actual measurement positions can be reduced by performing this control. This can shorten the operation time of calibration.

Subsequently, the second control for updating the mechanism error parameters will be described below. In the embodiment described above, the position and orientation of the measuring-device coordinate system 73 relative to the reference coordinate system 71 is determined in advance. In other words, the position of the measuring-device robot 8 relative to the installation position of the robot 1 is determined in advance. In the calibration apparatus of the present embodiment, however, a large number of actual measurement positions are measured. The position and orientation of the measuring-device coordinate system 73 relative to the reference coordinate system 71 can be expressed as variable numbers. For example, the position and orientation of the measuring-device coordinate system 73 can be expressed as coordinate values in the reference coordinate system 71. These coordinate values can be set at variable numbers.

The parameter calculation unit 55 can calculate the coordinate values of the measuring-device coordinate system 73 in the reference coordinate system 71 when calculating the first mechanism error parameters according to the method of least squares. In other words, the parameter calculation unit 55 can calculate the position and orientation of the measuring-device coordinate system 73 relative to the reference coordinate system 71 based on the actual measurement positions of the robot 1 and the information on the status of the robot 1. In this way, the parameter calculation unit 55 can calculate the position of the three-dimensional measuring device 8 relative to the installation position of the robot 1. By adopting this control, the mechanism error parameters can be calibrated without determining the position of the three-dimensional measuring device 8 relative to the installation position of the robot 1 in advance.

Subsequently, third control for updating the mechanism error parameters will be described below. In the third control, the parameter calculation unit 55 calculates the position of the reflector 67 relative to the position of the flange 16 based on the actual measurement positions of the robot and the information on the status of the robot. In the third control, the position of the reflector 67 relative to the position of the flange 16 is calculated according to the same method as the calculation of the position of the three-dimensional measuring device 8 in the second control. For example, the position of the flange 16 corresponds to the position of the origin of the flange coordinate system 72. The position of the reflector 67 can be expressed by the coordinate values of the flange coordinate system 72. The parameter calculation unit 55 can set coordinate values in the flange coordinate system 72 at variable numbers.

The parameter calculation unit 55 can calculate the coordinate values of the reflector 67 in the flange coordinate system 72 with the first mechanism error parameters according to the method of least squares. This control can calibrate the mechanism error parameters without determining the position of the reflector 67 relative to the position of the flange 16 in advance. For example, in some cases, the reflector 67 is attached without using a dedicated fixture for determining the position of the reflector 67 relative to the flange 16. Even if the reflector 67 is not attached using the dedicated fixture, the mechanism error parameters can be calibrated.

The three-dimensional measuring device 8 of the present embodiment is formed so as to measure the positions of the reflectors 67 and 68 by oscillation and reception of a laser beam, but the configuration is not limited to this. The three-dimensional measuring device may be any device capable of accurately measuring the actual position and orientation of the robot. In the present embodiment, the position of the robot 1 is measured by the three-dimensional measuring device 8 in a state in which the hand 2 is attached, but the embodiment is not limited to this. The positions of the robot 1 may be measured in a state in which the hand 2 is detached.

The calibration apparatus according to the configuration of the present disclosure can calibrate the mechanism error parameters in a short time.

In the forgoing control, the order of steps can be optionally changed as long as the functions and effects are not modified.

The foregoing embodiment can be optionally combined with another. In the drawings, the same or equivalent parts are indicated by the same reference numerals. The foregoing embodiment is merely exemplary and does not limit the invention. The embodiment includes the modifications described in the claims.

The invention claimed is:

1. A robot controller, comprising:
at least one memory configured to store a plurality of mechanism error parameters constituted by a first mechanism error parameter and a second mechanism error parameter; and
at least one processor,
wherein the at least one processor is configured to:
acquire an actual measurement position and information on a status of a robot by driving the robot with a plurality of orientations at a plurality of positions based on using only the second mechanism error parameter,
calculate a third mechanism error parameter by correcting a value of the first mechanism error parameter based on the acquired actual measurement position and information on the status of the robot, and
control the robot based on the plurality of mechanism error parameters including the second mechanism error parameter and the third mechanism error parameter,
wherein the plurality of mechanism error parameters includes at least one parameter selected from a group of DH parameters, variable numbers for an elastic deformation of links, and spring constants relating to torque around drive axes.

2. The robot controller according to claim 1, wherein the at least one processor is further configured to set the first mechanism error parameter and the second mechanism error parameter for each drive axis of the robot.

3. The robot controller according to claim 1, wherein:
the robot includes a plurality of drive axes,
the at least one memory stores the plurality of drive axes of the robot as drive axis information, each drive axis of the plurality of drive axes in relation to each of the plurality of mechanism error parameters, and
the at least one processor drives the robot so as to drive the drive axis in relation to the first mechanism error parameter from among the plurality of the drive axes of the robot and stop the drive axis other than the drive axis in relation to the first mechanism error parameter.

4. The robot controller according to claim 1, wherein the processor comprises a plurality of measurement points for measuring the actual measurement position of the robot that are predetermined, and
the plurality of measurement points are set so as to be evenly scattered in a motion range of the robot.

5. The robot controller according to claim 1, wherein the at least one processor automatically changes a mechanism error parameter to be designated to the first mechanism error parameter from among the plurality of the mechanism error parameters so as to calculate the third mechanism error parameter.

6. A teaching pendant connected to a robot controller for controlling a robot based on a plurality of mechanism error parameters, comprising:

a display part configured to display information in relation to the robot;

an input part configured to receive input of at least one piece of information in relation to a component of the robot or information in relation to a reason for performing calibration of the robot, based on the information in relation to the robot displayed on the display part, wherein the teaching pendant is configured to cause the robot controller to set a first mechanism error parameter selected from the plurality of mechanism error parameters based on the information received by the input part, wherein the first mechanism error parameter is a parameter which is calibrated by driving the robot in a state in which the first mechanism error parameter is invalidated and only the mechanism error parameter other than the first error parameter is valid, and wherein the plurality of mechanism error parameters includes at least one parameter selected from a group of DH parameters, variable numbers for an elastic deformation of links, and spring constants relating to torque around drive axes.

7. The teaching pendant according to claim 6, wherein the display part displays a list of the plurality of mechanism error parameters.

8. The teaching pendant according to claim 6, wherein the information in relation to the component of the robot includes at least one piece of information in relation to a replaced component of the robot or information in relation to a hand attached to the robot.

* * * * *